(12) United States Patent
Milne et al.

(10) Patent No.: US 8,576,731 B2
(45) Date of Patent: Nov. 5, 2013

(54) RANDOM DATA COMPRESSION SCHEME IN A NETWORK DIAGNOSTIC COMPONENT

(75) Inventors: Andrew J. Milne, Sierra Madre, CA (US); Roumel R. Garcia, Vallejo, CA (US); Paul R. Gentieu, Sunnyvale, CA (US); Geoffrey T. Hibbert, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1419 days.

(21) Appl. No.: 11/675,046

(22) Filed: Feb. 14, 2007

(65) Prior Publication Data
US 2007/0189176 A1    Aug. 16, 2007

Related U.S. Application Data

(60) Provisional application No. 60/773,473, filed on Feb. 14, 2006.

(51) Int. Cl.
*H04J 3/14* (2006.01)
*H04J 3/16* (2006.01)

(52) U.S. Cl.
USPC ..................................... 370/252; 370/437

(58) Field of Classification Search
USPC ................................. 370/437, 252
See application file for complete search history.

(56) References Cited

U.S. PATENT DOCUMENTS

| | | | |
|---|---|---|---|
| 5,304,990 A | 4/1994 | Rebourg et al. | |
| 5,357,523 A * | 10/1994 | Bogholtz et al. | 714/718 |
| 5,621,799 A * | 4/1997 | Katta et al. | 380/217 |
| 5,850,388 A | 12/1998 | Anderson et al. | |
| 5,946,301 A | 8/1999 | Swanson et al. | |
| 6,011,778 A | 1/2000 | Kilkki et al. | |
| 6,128,715 A | 10/2000 | Wang et al. | |
| 6,205,190 B1 | 3/2001 | Antonio et al. | |
| 6,268,808 B1 | 7/2001 | Iryami et al. | |
| 6,385,297 B2 | 5/2002 | Faulkner et al. | |

(Continued)

FOREIGN PATENT DOCUMENTS

| | | |
|---|---|---|
| CN | 200780010952 | 9/2010 |
| EP | 07757009.1 | 8/2010 |

(Continued)

OTHER PUBLICATIONS

U.S. Appl. No. 12/061,356, filed Apr. 2, 2008, Kotturu et al.

(Continued)

*Primary Examiner* — Farah Faroul
(74) *Attorney, Agent, or Firm* — Volentine & Whitt, PLLC (57) ABSTRACT

A network diagnostic component or device that is placed in-line between a first and second node. The diagnostic component or device is used to compress a random data signal. For example, the first node may communicate with the second node using a random data signal that includes random data units that represent a first data unit. In some embodiments, the random data signal may be of the Serial Attached Small Computer System Interface ("SAS")/Serial Advanced Technology Attachment ("SATA") protocol. The network diagnostic component may receive the random data signal and associate at least one random data unit with identifier that is indicative of the first data unit. This random data unit may be recorded in a memory. A representation of the random data units that are different from the random data unit associated with the identifier is also recorded in the memory.

17 Claims, 3 Drawing Sheets

(56) References Cited

U.S. PATENT DOCUMENTS

| | | |
|---|---|---|
| 6,429,811 B1 * | 8/2002 | Zhao et al. ............... 342/357.09 |
| 6,510,156 B1 | 1/2003 | Brock et al. |
| 6,526,362 B2 | 2/2003 | Jones et al. |
| 6,618,360 B1 | 9/2003 | Scoville et al. |
| 6,687,641 B2 | 2/2004 | Jones |
| 6,715,105 B1 * | 3/2004 | Rearick .......................... 714/30 |
| 6,868,495 B1 * | 3/2005 | Glover ......................... 713/190 |
| 7,103,050 B1 | 9/2006 | Luijten et al. |
| 7,281,167 B2 | 10/2007 | Dube |
| 7,404,013 B1 * | 7/2008 | Masiewicz ........................ 710/5 |
| 7,539,489 B1 | 5/2009 | Alexander |
| 7,584,319 B1 * | 9/2009 | Liao et al. ..................... 710/317 |
| 7,599,293 B1 | 10/2009 | Bain et al. |
| 2001/0039580 A1 * | 11/2001 | Walker et al. ................. 709/224 |
| 2002/0064255 A1 | 5/2002 | Mohammadian et al. |
| 2002/0112044 A1 | 8/2002 | Hessmer et al. |
| 2003/0028509 A1 | 2/2003 | Sah et al. |
| 2003/0033397 A1 | 2/2003 | Gurumoorthy et al. |
| 2003/0081125 A1 | 5/2003 | Sheldon et al. |
| 2003/0142629 A1 | 7/2003 | Krishnamurthi et al. |
| 2003/0212694 A1 | 11/2003 | Potapov et al. |
| 2003/0224797 A1 | 12/2003 | Kuan et al. |
| 2004/0006574 A1 | 1/2004 | Witkowski et al. |
| 2004/0049596 A1 | 3/2004 | Schuehler |
| 2004/0054776 A1 * | 3/2004 | Klotz et al. ................... 709/224 |
| 2004/0057389 A1 | 3/2004 | Klotz et al. |
| 2004/0170383 A1 | 9/2004 | Mazur |
| 2004/0208501 A1 | 10/2004 | Saunders et al. |
| 2004/0215421 A1 | 10/2004 | Schmitz et al. |
| 2004/0225729 A1 | 11/2004 | Sabiers et al. |
| 2005/0060402 A1 | 3/2005 | Oyadomari et al. |
| 2005/0071445 A1 | 3/2005 | Siorek et al. |
| 2006/0061369 A1 | 3/2006 | Marks et al. |
| 2006/0095630 A1 | 5/2006 | Bashford et al. |
| 2006/0117189 A1 | 6/2006 | Chiu et al. |
| 2006/0153177 A1 | 7/2006 | Worrall et al. |
| 2006/0168207 A1 | 7/2006 | Choong et al. |
| 2006/0224822 A1 | 10/2006 | Blomquist et al. |
| 2006/0267798 A1 * | 11/2006 | Jacobsen et al. .............. 340/931 |
| 2007/0061681 A1 * | 3/2007 | Carmichael ................... 714/760 |
| 2007/0299999 A1 | 12/2007 | Duerk et al. |
| 2008/0052586 A1 * | 2/2008 | Rajski et al. .................. 714/741 |

FOREIGN PATENT DOCUMENTS

| | | |
|---|---|---|
| WO | WO 01/01272 | 1/2001 |
| WO | WO 02/087124 | 10/2002 |
| WO | PCT/US2007/062162 | 6/2008 |

OTHER PUBLICATIONS

U.S. Appl. No. 11/675,045, filed Feb. 14, 2007, Vedanabhatla et al.
U.S. Appl. No. 11/675,041, filed Feb. 14, 2007, Vedanabhatla et al.
U.S. Appl. No. 11/675,036, filed Feb. 14, 2007, Gentieu et al.
Working Draft American National Standard, Serial Attcahed SCSI-1.1 (SAS-1.1)' Specification, Revision Mar. 4, 2004.
Compression and Decompressing Data Using Java APIs' by Mahmoud et al., Feb. 2002.
LeCroy's 'SASTracker' Datasheet, copyright 2006.
LeCroy's 'SAS InFusion and SATA In Fusion Error Injector and Traffic Modifier' Datasheet, copyright 2005.
Penokie, George, Alternate SAS Speed Negotiation State Diagram, Oct. 10, 2002, T10/02-405 Rev. 0, T10 Committee (SCSI).
Elliot, Rob, Serial Attached SCSI Phy Layer, Sep. 30, 2003, HP Industry Standard Servers, SCSI Trade Association.
U.S. Appl. No. 11/675,045, filed Mar. 23, 2010, Final Office Action.
U.S. Appl. No. 11/675,045, filed Jul. 17, 2009, Office Action.
U.S. Appl. No. 11/675,045, filed Oct. 29, 2008, Office Action.
U.S. Appl. No. 11/675,041, filed Mar. 2, 2010, Final Office Action.
U.S. Appl. No. 11/675,041, filed Jun. 24, 2009, Office Action.
U.S. Appl. No. 11/675,036, filed Mar. 24, 2010, Final Office Action.
U.S. Appl. No. 11/675,036, filed Sep. 4, 2009, Office Action.
Dr. Thomas Porter: "The Perils of Deep Packet Inspection" SecurityFocus.com Jan. 11, 2005.
Sundaresan and Moussa, "Algorithms and programming models for efficient representation of XML for Internet applications," Computer Networks (2002).
U.S. Appl. No. 11/675,045, filed Jul. 27, 2010, Office Action.
U.S. Appl. No. 11/675,041, filed Oct. 6, 2010, Office Action.

* cited by examiner

RANDOM DATA COMPRESSION SCHEME IN A NETWORK DIAGNOSTIC COMPONENT

CROSS-REFERENCE TO RELATED APPLICATIONS

This application claims the benefit of U.S. Provisional Application No. 60/773,473, filed Feb. 14, 2006, which is incorporated herein by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 Gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic device or component that is placed in-line between two nodes in a network to compress a random data signal. For example, in one embodiment the network diagnostic component receives a random data signal from a first node for communication with a second node. The random data signal includes at least one or more random data units that represent a first data unit.

The network diagnostic component associates at least one random data unit with identifier that is indicative of the first data unit. The network diagnostic component then records the random data unit associated with the identifier in a memory and generates a representation in the memory of at least one random data unit that is different from the random data unit associated with the identifier.

In additional embodiments, the network diagnostic component receives a random data signal that includes at least one or more random data units that represent a first data unit. The network diagnostic component generates a representation in a memory of the random data units. An identifier that indicates the first data unit is then associated with the random data units.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The embodiments disclosed herein relate to a network diagnostic component or device that is placed in-line between a first and second node of a network. The diagnostic component or device is used to compress a random data signal. For example, the first node may communicate with the second node using a random data signal that includes random data units that represent a first data unit. In some embodiments, the random data signal may be of the SAS/SATA protocol. The network diagnostic component may receive the random data signal and associate at least one random data unit with identifier that is indicative of the first data unit. This random data unit may be recorded in a memory. A representation of the random data units that are different from the random data unit associated with the identifier is also recorded in the memory.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described. Note that as used herein the terms "first", "second" and so forth are not intended to imply sequential ordering, but rather are intended to distinguish one element from another.

Example Networking System

Figure 1:
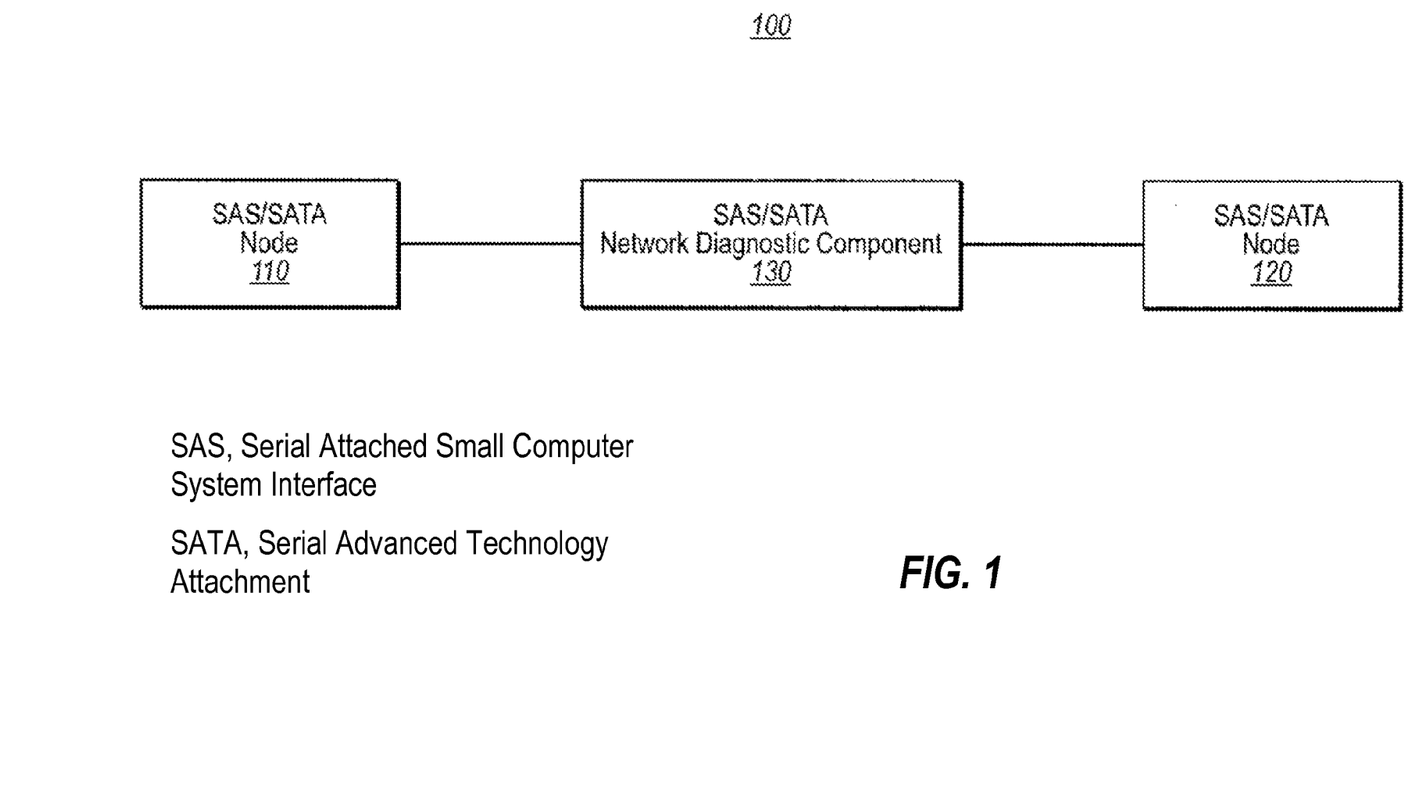
FIG. 1 illustrates a block diagram of a network including a network diagnostic component placed in-line between two network nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110,120 are available to network diagnostic component 130 and/or are routed through the network diagnostic component 130. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110, 120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

Random Data in a Diagnostic Network

In some instances, nodes 110, 120 often get into a mode of repeating the same primitive ordered set of Dwords for long periods of time. For instance, in SATA, when one of the network nodes is ready for further instructions, the node will often transmit continued repeating primitives (often referred to as "continued primitives") in the form of a repeating SATA_R_RDY primitive. In SAS, when one of the network nodes is idle (and thus presumably ready for further commands), the node will transmit continued primitives in the form of SAS_IDLE primitives.

These repeated continued primitives (which can typically be Dwords) may be potentially problematic. For example, transmitting the same primitives for long periods often leads to undesirable Electro Magnetic Interference (EMI). This is because signals that have repeating bit sequences have a well defined static frequency profile, where some of the dominant frequencies in the profile may be particularly harmful to other circuitry. On the other hand, randomly generated bit sequences tend to have changing frequency profiles.

To prevent possible EMI effects, some protocols such as SAS and SATA implement a scheme for detecting when a continued primitive is being transmitted for too long, and then signal the receiving node that the transmitting node is going to send random data instead of the continued primitive for a predetermined period of time or until further notice. The receiving node will then know that when the random data is received, that random data represents the continued primitive, and thus act according the continued primitive, even though it only received the random data.

For instance, referring to FIG. 1, suppose node 110 was in a mode that required it to transmit 1 million SATA_R_RDY primitive Dwords to node 120. The EMI reduction scheme of the SATA protocol causes node 110 to send the following sequence instead: SATA_R_RDY, SATA_R_RDY, SATA_CONT, Random Data 1, Random Data 2 . . . Random Data 999,997. The receiving node 120 will obviously recognize the first two SATA_R_RDY primitives. However, the receiving node 120 will also recognize the SATA_CONT primitive as doing two things. First, the SATA_CONT primitive represents a SATA_R_RDY primitive, and thus will be interpreted as such at node 120. Second, the SATA_CONT primitive signals that all following data, although random data, represents a SATA_R_RDY primitive and thus should be interpreted as such at the node 120. When receiving the subsequent 999,997 segments of Random Data, the node 120 will thus know that each instance of the following Random Data will thus represent a SATA_R_RDY primitive.

Although helping to reduce the EMI effects, the use of the random data may tax the available buffer space of network diagnostic component 130 in embodiments where it is desirable to capture all of the transmitted primitive Dwords. This is because network diagnostic component 130 would quickly fill its capture buffer if all of the random data was captured in full, which could have negative effects on the operation of network diagnostic component 130.

Figure 2:
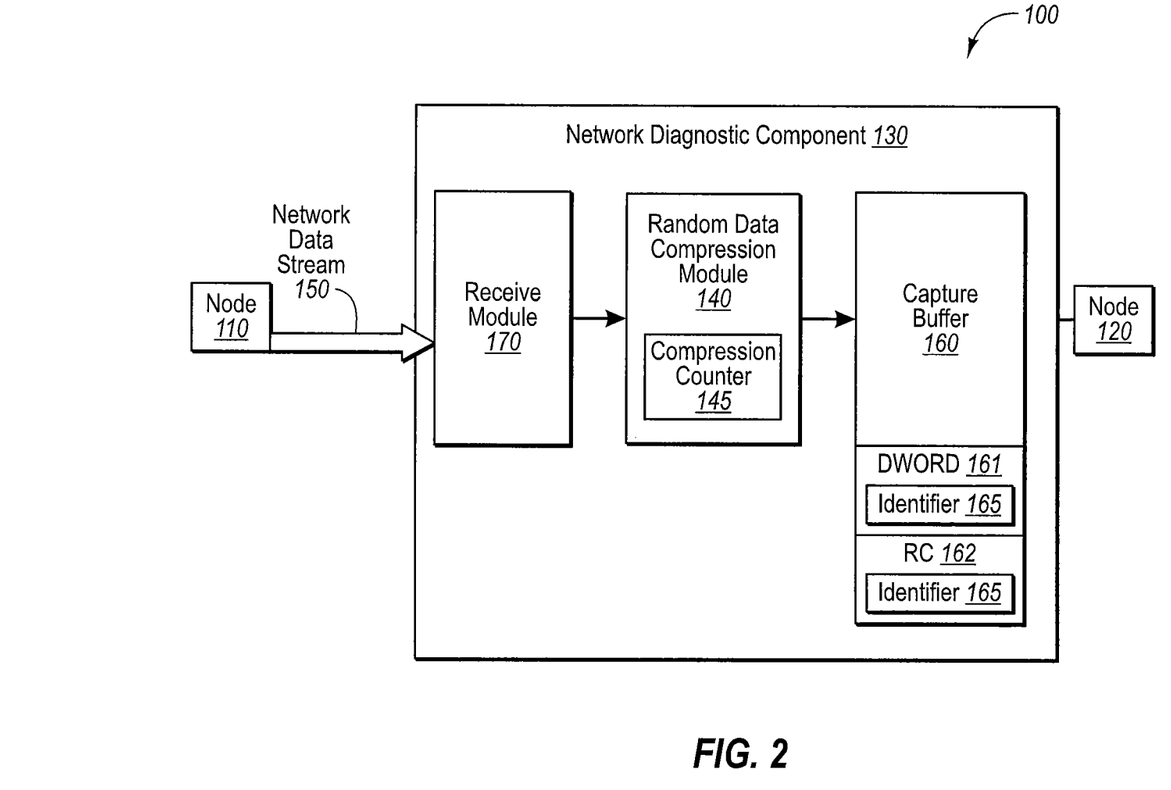
FIG. 2 illustrates a detailed view of a particular embodiment of the network diagnostic component of FIG. 1.

To help prevent any negative effects and to save buffer space, the embodiments disclosed herein relate to a method to compress the random data. This allows network diagnostic component 130 to capture the essence of the random data and then store a repeat count of how many instances of random Dwords that were transmitted. Such embodiments will be described with reference to FIG. 1, which was previously described, and FIG. 2, which shows a detailed view of one particular embodiment of network diagnostic component 130. Note that the embodiment of FIG. 2 is only one of numerous examples of a network diagnostic component 130 that can be used to implement the embodiments disclosed herein. Although the following embodiments will be described using the SAS and SATA protocols, this is by way of example only and should not be used to limit the scope of the appended claims. Other suitable protocols may also be utilized by the embodiments disclosed herein Example Random Data Compression Scheme FIG. 2 illustrates that network diagnostic component 130 includes a receive module 170, a random data compression module 140 and a capture buffer 160. The random data compression module 140, which may be a trace formatting/compression engine, may be implemented as software, hardware, or any combination of the two. The capture buffer 160 may be any reasonable persistent and/or non-persistent memory source.

In operation, receive module 170 receives random data included within network data stream 150 from node 110. The random data is then provided to random data compression module 140, where the compression operation occurs as will be explained below. Note that although the following examples show that node 110 is the transmitting node, this is by way of example only. Node 120 may also be the transmitting node in some embodiments.

In the SATA protocol, there are 11 continued primitives that may be replaced using random data to thereby promote EMI protection. In the SAS protocol, there is one, which is the SAS idle. Table 1 below lists these 11 continued primitives as well as the SAS Idle continued primitive. In addition, Table 1 lists the corresponding identifier (as expressed in binary and hexadecimal for convenience) for each of the continued primitives that can be used in the capture buffer 160 to record what primitive Dword is being continued by the random data.

TABLE 1

| Continued Primitive | Binary value | Hexidecimal value |
|---|---|---|
| SAS Idle | 0000 | 0x0 |
| SATA_HOLD | 0001 | 0x1 |
| SATA_HOLDA | 0010 | 0x2 |
| SATA_PMREQ_P | 0011 | 0x3 |
| SATA_PMREQ_S | 0100 | 0x4 |
| SATA_R_ERR | 0101 | 0x5 |
| SATA_R_IP | 0110 | 0x6 |
| SATA_R_OK | 0111 | 0x7 |
| SATA_R_RDY | 1000 | 0x8 |
| SATA_SYNC | 1001 | 0x9 |
| SATA_WTRM | 1010 | 0xA |
| SATA_X_RDY | 1011 | 0xB |
| UNKNOWN PRIMITIVE | 1111 | 0xF |

Operation in SATA

The operation of random data compression module 140 while operating on a SATA transmission will now be explained. For example, suppose that network data stream 150 consisted of: SATA_R_RDY, SATA_R_RDY, SATA_CONT, Random Data 1, Random Data 2 . . . Random Data N (wherein N is a positive integer greater than two).

As mentioned above, network data stream 150 is provided to random data compression module 140. Upon reception, random data compression module 140 compresses the network data stream 150 by recording the first few Dwords in a record 161 and compressing the rest into a repeat count 162 that is saved in capture buffer 160.

For example, after the compression operation, the SATA_R_RDY, SATA_R_RDY, SATA_CONT primitive Dwords may be captured in record 161. As mentioned, the SATA_CONT would alert network diagnostic component 130 that random data representing the SATA_R_RDY signal is to follow. A counter 145 in random data compression engine 140 may then count the random data Dwords. The counted value may then be written as record 162 in capture buffer 160. Advantageously, valuable memory space is saved.

In some embodiments, random data compression engine 140 may associate an identifier tag 165 with the SATA_CONT primitive Dword and one or more of the following random data Dwords. The identifier tag 165 represents the first Dword that was received. The identifier tags 165 allow a user of network diagnostic component 130 to ascertain what primitive Dword is being represented by the random data. This is especially useful if the first received primitive Dword was not known or captured, which may occur when if network diagnostic component 130 begins a capture operation in the middle of a random data sequence. As noted in Table 1, an unknown primitive is denoted by 0xF.

For instance, using the example network data stream 150 from above, the SATA_CONT primitive Dword may have an identifier tag 165 of 0x8 (see Table 1) associated with it to represent that the first received primitive Dword was the SATA_R_RDY primitive Dword. The 0x8 identifier 165 may also be associated with one or more random data Dwords that follow, signifying that the random data Dwords also represent the SATA_R_RDY primitive Dword. The identifier tag 165 may be recorded as part of records 161 and/or 162 in the capture buffer 160. As mentioned above, as long as the random data pattern continues, a SATA_R_RDY primitive Dword is implied and this continues until network diagnostic component 130 is excited by a sequence breaking primitive.

Operation in SAS

The operation of random data compression module 140 while operating on a SAS transmission will now be explained. For example, suppose that network data stream 150 consisted of: Random Data 1, Random Data 2 . . . Random Data M.

As mentioned, network data stream 150 is received by data compression module 140. Upon reception, random data compression module 140 compresses the network data stream 150 by capturing continued primitives as well as the first random Dword in record 161 and compressing the rest into a repeat count that is saved in capture buffer 160 as record 162.

For example, after the compression operation, the first random data primitive Dword would be captured in record 161. The random data compression engine 140 may associate identifier tag 165 of 0x0 with the first random data that is stored in the record 161. As mentioned above, in SAS the random data primitive Dwords all represent a SAS_Idle primitive Dword. The counter 145 would then count all subsequent random data primitive Dwords and this count would be recorded in record 162. The identifier 165 may also be associated with the repeat count record 162. As mentioned above, as long as the random data pattern continues, a SAS Idle primitive is implied and this continues until network diagnostic component is excited by a sequence breaking primitive.

Further Compression

In some embodiments, it may be possible for compression module 140 to further compress network data stream 150. For example, in the SATA protocol it may be possible to compress data stream 150 to a Repeat Count N with an associated identifier 165. For example, a repeat count N with an identifier tag 165 of 0x8 may represent the typical SATA_R_RDY, SATA_R_RDY, SATA_CONT sequence followed by N random Dwords. This compression is achieved because the identifier 0x8 would flag that record 161 in capture buffer 160 represents a classic SATA_R_RDY sequence.

In similar manner, in the SAS protocol it may be possible to compress data 150 to Repeat Count M with identifier 165 of 0x0. This would represent M SAS Idle Dwords. The identifier 0x0 would flag in capture buffer 160 that record 161 represents classic SAS Idles.

Example Methods of Random Data Compression

Figure 3:
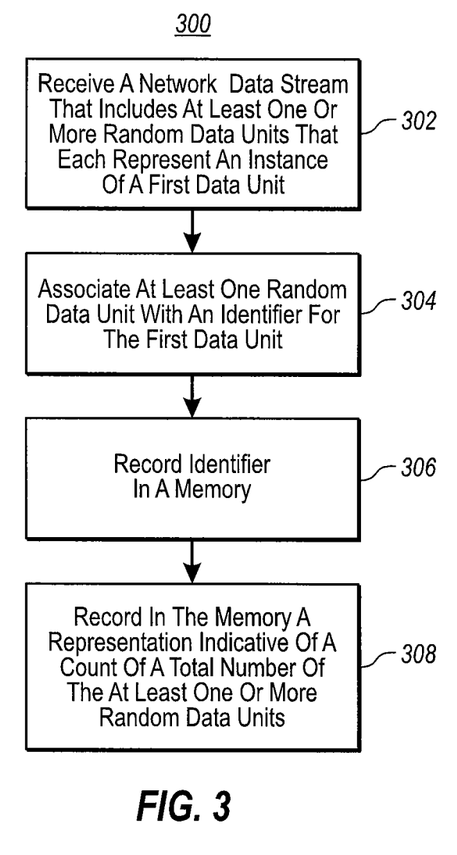
FIG. 3 illustrates a method for a network diagnostic component placed in-line between two nodes to compress a random data stream.

Referring now to FIG. 3, a flowchart of a method 300 for an in-line diagnostic component to compress random data is illustrated. Method 300 will be described in relation to the network system of FIGS. 1 and 2, although this is not required. It will be appreciated that method 300 may be practiced in numerous a HD diagnostic network systems.

Method 300 includes an act of receiving a network data stream for communication between the first and second nodes, the network data stream including at least one or more random data units that each represent an instance of a first data unit (act 302). For instance, the first data unit might be a continued primitive as mentioned above with respect to the SAS and SATA protocols. For example, network diagnostic component 130, specifically receive module 170, may receive network data stream 150 from either node 110 or node 120, which may be SAS/SATA devices. The network data stream 150 may include one or more random data units that represent a first data unit (e.g., that represent the associated continued primitive). For instance, the random data units may represent a SATA primitive Dword as listed in Table 1 or a SAS Idle Dword. Note that as used herein "random data" means data units that represent a continuation of the first data unit and whose values are not individually important or individually identifiable. In other words, the random data following the first identifiable data unit is of a varying nature that on its own cannot be identified.

In some embodiments, network data stream 150 may also include the first data unit (i.e., may include the continued primitive itself). As described above, a SATA_R_RDY primitive Dword may comprise the first data unit and the random data units may be include in the network data stream 150 to represent the SATA_R_RDY data unit or Dword.

Method 300 also includes an act of associating at least one of the random data units with an identifier for the first data unit (act 304). For example, random data compression module 140, or other component of network diagnostic component 130, may associate an identifier 165 with one or more of the random data units. The identifier may be as recorded in memory instead of recording the actual primitive Dwords in Table 1. The identifier 165 indicates what primitive Dword the random data units represent.

Method 300 further includes an act of recording the identifier in the memory (act 306). For example, network diagnostic component 130, which may be a SAS/SATA network diagnostic device, may record the identifier 165 in capture buffer 160. In some embodiments, the first data unit (e.g., the SATA_R_RDY primitive Dword from the above example) may also be recorded in capture memory 160 as record 161.

Method 300 additionally includes an act of recording in the memory a representation indicative of a count of the total number of the at least one or more random data units (act 308). For example, network diagnostic component 130 may generate a representation of the total number of random data units included in data stream 150 and store the representation in capture buffer 160. In some embodiments, a compression counter 145 counts the random data units. The count value is then used by random data compression module 140 to generate a repeat count record 162 in buffer 160.

In some embodiments, the contents of records 161 and 162 may be displayed by a display device attached to network diagnostic component 130 to allow for user interaction. In further embodiments, the identifier associated with the random data unit in act 304 may be used by the user of network diagnostic component 130 to identify the first data unit represented by the random data units. This allows the user to ascertain the primitive Dword that the transmitting node was intending to send in instances where the user did not see the first Dword sent in the data stream or where the first Dword was not captured by network diagnostic device 130.

Figure 4:
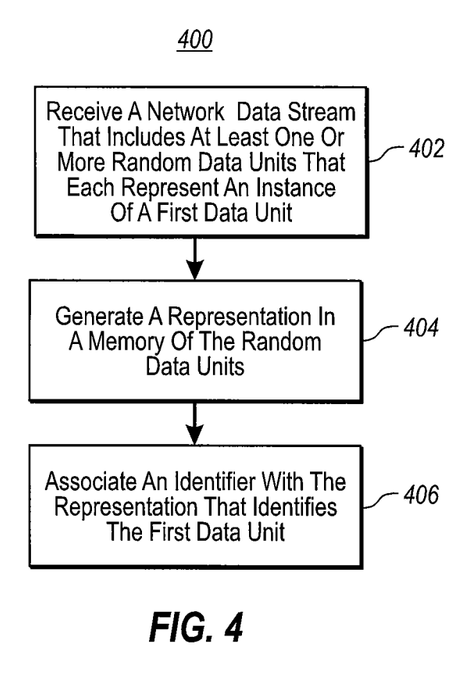
FIG. 4 illustrates an additional method for a network diagnostic component placed in-line between two nodes to compress a random data stream.

Referring to FIG. 4, a flowchart of an additional method 400 for an in-line diagnostic component to compress random data is illustrated. Method 400 will be described in relation to the network system of FIGS. 1 and 2, although this is not required. It will be appreciated that method 400 may be practiced in numerous diagnostic network systems.

Method 400 includes an act of receiving a network data stream for communication between the first and second nodes that includes at least one or more random data units that each represent an instance of a first data unit (act 402). For example, network diagnostic component 130, specifically receive module 170, may receive random data stream 150 from either node 110 or node 120, which may be SAS/SATA devices. The network data stream 150 may include one or more random data units that represent a first data unit. For instance, the random data units may represent a SATA primitive Dword as listed in Table 1 or a SAS Idle Dword.

Method 400 also includes an act of generating a representation in a memory of the at least one or more random data units (act 404). For example, random data compression engine 140 may generate a representation of the random data units in capture buffer 160. In some embodiments, a compression counter 145 counts the random data units. The count value is then used by random data compression module 140 to generate a repeat count record 162 in buffer 160.

Method 400 further includes an act of associating an identifier with the representation, wherein the identifier identifies the first data unit represented by the random data units (act 406). For example, random data compression engine 140, or some other component of network diagnostic component 130, may associate the representation created in act 404 with identifier 165. The identifier 165 may be used to identify the data unit represented by the random data. As described previously, for instance, the identifiers in Table 1 may be used to represent SAS and SATA primitive Dwords that are represented by the random data units.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or z more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receive a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y."

The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety Example Systems It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for a network diagnostic component that is placed in-line between first and second nodes in a network to compress network traffic, the method comprising:
    an act of receiving a network data stream for communication between the first and second nodes, wherein the network data stream comprises:
        a first primitive data unit that does not include destination information, at least one or more random data units that each represent an instance of a first primitive data unit, wherein the random data units are not individually identifiable, and a sequence breaking primitive that indicates an end of the at least one or more random data units;

an act of associating at least one of the random data units with an identifier that specifies the first primitive data unit, wherein the identifier for the first primitive data unit is specific to that primitive data unit and is different from identifiers for other primitive data units;

an act of recording the identifier in a memory; and an act of recording in the memory a representation indicative of a first count of a total number of the at least one or more random data units, wherein the first count is the number of random data units that occur after the first primitive data unit and before the sequence breaking primitive in the network data stream.

2. The method in accordance with claim 1 further comprising:

an act of recording the first data unit in the memory.

3. The method in accordance with claim 1, wherein the act of recording in the memory a representation indicative of the first count comprises:

an act of recording a repeat count record in the memory.

4. The method in accordance with claim 1, further comprising:

an act of displaying the contents of the memory on a display device.

5. The method in accordance with claim 1, wherein the network diagnostic component is a Serial Attached Small Computer System Interface ("SAS")/Serial Advanced Technology Attachment ("SATA") network diagnostic component.

6. The method in accordance with claim 1, wherein the first data unit is one of the following primitive Dwords: SAS Idle, SATA_HOLD, SATA_HOLDA, SATA_PMREQ_P, SATA_PMREQ_S, SATA_ERR, SATA_R_IP, SATA_R_OK, SATA_R_RDY, SATA_SYNC, SATA_WTRM, or SATA_X_RDY.

7. The method in accordance with claim 1 further comprising:

an act of using the identifier to identify the first data unit.

8. A tangible network diagnostic device placed in-line between first and second nodes in a network comprising:

a first module configured to receive a network data stream for communication between the first and second nodes, wherein the network data stream comprises:

a first primitive data unit that does not include destination information, at least one or more random data units that each represent an instance of a first primitive data unit, wherein the random data units are not individually identifiable, and a sequence breaking primitive that indicates an end of the at least one or more random data units;

a second module configured to associate at least one of the random data units with an identifier that is indicative of the first primitive data unit, wherein the identifier for the first primitive data unit is specific to that primitive data unit and is different from identifiers for other primitive data units;

a third module configured to record the identifier in a memory; and a fourth module configured to generate a record to be recorded in the memory of a representation indicative of a first count of a total number of the at least one or more random data units, wherein the first count is the number of random data units that occur after the first primitive data unit and before the sequence breaking primitive in the network data stream.

9. The network diagnostic device in accordance with claim 8, wherein the first and second nodes are Serial Attached Small Computer System Interface ("SAS")/Serial Advanced Technology Attachment ("SATA") nodes and the network diagnostic component is a SAS/SATA network component.

10. The network diagnostic device in accordance with claim 8, wherein the network diagnostic device is one of a bit error rate tester, a protocol analyzer, a generator, a jammer, and a monitor.

11. The network diagnostic device in accordance with claim 8, wherein the first module is a state machine.

12. The network diagnostic device in accordance with claim 8, wherein the second and third modules are a trace formatting/compression engine.

13. The network diagnostic component in accordance with claim 8, wherein the second and third modules are the same module.

14. The network diagnostic device in accordance with claim 8, wherein the memory is a capture buffer.

15. The network diagnostic device in accordance with claim 8, wherein the fourth module is a compression counter.

16. The network diagnostic device in accordance with claim 8, wherein the first data unit is one of the following primitive Dwords: SAS Idle, SATA_HOLD, SATA_HOLDA, SATA_PMREQ_P, SATA_PMREQ_S, SATA_R_ERR, SATA_R_IP, SATA_R_OK, SATA_R_RDY, SATA_SYNC, SATA_WTRM, or SATA_X_RDY.

17. The network diagnostic device in accordance with claim 8, wherein the network diagnostic device is further configured to use the identifier to determine the first primitive data unit.

* * * * *